(12) United States Patent
Nakayama

(10) Patent No.: US 7,952,800 B2
(45) Date of Patent: May 31, 2011

(54) VARIABLE POWER RELAY OPTICAL SYSTEM AND MICROSCOPE EQUIPPED THEREWITH

(75) Inventor: Hiroaki Nakayama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/707,566

(22) Filed: Feb. 17, 2010

(65) Prior Publication Data

US 2010/0142037 A1 Jun. 10, 2010

Related U.S. Application Data

(63) Continuation of application No. PCT/JP2008/065793, filed on Aug. 27, 2008.

(30) Foreign Application Priority Data

Sep. 4, 2007 (JP) ................................. 2007-229219

(51) Int. Cl.
*G02B 23/24* (2006.01)
*G02B 15/14* (2006.01)
(52) U.S. Cl. .......................... 359/434; 359/676; 359/687
(58) Field of Classification Search ................... 359/368, 359/385, 434–435, 676–690
See application file for complete search history.

(56) References Cited

U.S. PATENT DOCUMENTS

| | | | |
|---|---|---|---|
| 5,383,058 A | 1/1995 | Yonezawa | |
| 5,729,385 A * | 3/1998 | Nishida et al. | ................. 359/434 |
| 5,959,772 A | 9/1999 | Yonezawa | |
| 7,362,511 B2 * | 4/2008 | Suzuki | ........................... 359/687 |
| 7,593,157 B2 * | 9/2009 | Suzuki et al. | ................. 359/380 |
| 2001/0026397 A1 | 10/2001 | Nishida | |
| 2004/0246592 A1 | 12/2004 | Suzuki | |
| 2006/0114554 A1 | 6/2006 | Suzuki et al. | |

FOREIGN PATENT DOCUMENTS

| | | |
|---|---|---|
| JP | 9-274137 A | 10/1997 |
| JP | 11-242189 | 9/1999 |
| JP | 2001-255464 A | 9/2001 |

* cited by examiner

*Primary Examiner* — Thong Nguyen
(74) *Attorney, Agent, or Firm* — Miles & Stockbridge P.C.

(57) ABSTRACT

A variable power relay optical system comprising: a variable power lens performing zooming a secondary image based on light from a primary image; and a rear group forming the secondary image based on the light passing through the variable power lens; the variable power lens consisting of, in order from the primary image side, a first group having positive power, a second group having negative power, a third group having positive power, and a fourth group having positive power, upon zooming from a high magnification end to a low magnification end, the fourth group being moved to the secondary image side, and a distance between the first group and the second group increasing, positions of the primary image and the secondary image, an entrance pupil of the variable power relay optical system, a pupil of the variable power lens, and an exit pupil of the variable power relay optical system being substantially kept constant, and the pupil of the variable power lens being disposed to the secondary image side of the last surface of the variable power lens.

9 Claims, 11 Drawing Sheets

VARIABLE POWER RELAY OPTICAL SYSTEM AND MICROSCOPE EQUIPPED THEREWITH

CROSS-REFERENCE TO RELATED APPLICATION

This application is a continuation of International Application No. PCT/JP2008/065793 filed Aug. 27, 2008.

TECHNICAL FIELD

The present invention relates to a variable power relay optical system having a position of an entrance pupil locating at an object side of a first surface of the lens, and extremely small variation in position of an exit pupil upon zooming in such as a zoom tube lens for a microscope, and a microscope equipped with the optical system.

BACKGROUND ART

There has been proposed a microscope whose relay optical system is made to be a zoom lens with keeping positional relation between a primary image and a secondary image to be constant and with keeping positional relation between an entrance pupil and an exit pupil of the relay optical system to be substantially constant, for example, see Japanese Patent publication No. 3726275.

However, in the conventional variable power relay optical system, since an exit pupil of the variable power lens system (hereinafter simply called as a "pupil of the variable power lens system") is located inside of the variable power lens system, when an optical modulation device such as a phase plate is disposed at the position of the pupil of the variable power lens system, the optical modulation device physically interferes with the lens.

DISCLOSURE OF THE INVENTION

The present invention is made in view of the aforementioned problems, and has an object to provide a variable power relay optical system having a pupil of a variable power lens system locating to the image side of the last lens surface thereof and extremely small variation in position of the pupil of the variable power lens system upon zooming, and a microscope equipped therewith.

In order to solve the problems, according to a first aspect of the present invention, there is provided a variable power relay optical system that forms a secondary image based on light from a primary image, comprising: a variable power lens system that carries out zooming the secondary image based on the light from the primary image; and a rear lens group that forms the secondary image based on the light passing through the variable power lens system; the variable power lens system consisting of, in order from the primary image side, a first lens group having positive refractive power, a second lens group having negative refractive power, a third lens group having positive refractive power, and a fourth lens group having positive refractive power, upon zooming from a high magnification end state to a low magnification end state, the fourth lens group being moved to the secondary image side, and a distance between the first lens group and the second lens group increasing, upon zooming the variable power lens system, positions of the primary image and the secondary image, an entrance pupil of the variable power relay optical system, a pupil of the variable power lens system, an exit pupil of the variable power relay optical system being substantially kept constant, and the pupil of the variable power lens system being disposed to the secondary image side of the last surface of the variable power lens system.

In the first aspect of the present invention, it is preferable that the third lens group is moved to the secondary image side along an optical axis upon zooming from the high magnification end state to the low magnification end state.

In the first aspect of the present invention, it is preferable that the following conditional expressions are satisfied:

$$\beta'2L < -1 \text{ and } -1 < \beta'2H$$

$$0.8 < \beta'2L \times \beta'2H < 1.25$$

where $\beta'2H$ denotes a magnification of the second lens group in the high magnification end state with respect to a light ray crossing the optical axis at the entrance pupil and the exit pupil of the variable power relay optical system, and $\beta'2L$ denotes a magnification of the second lens group in the low magnification end state with respect to the light ray.

In the first aspect of the present invention, it is preferable that the following conditional expression is satisfied:

$$VV'L - fL < VH'L$$

where fL denotes a focal length of the variable power lens system in the low magnification end state, VV'L denotes a distance between a front vertex of the first lens group and a rear vertex of the fourth lens group in the low magnification end state, and VH'L denotes a distance between the front vertex of the first lens group and a secondary principal point of the variable power lens system in the low magnification end state.

In the first aspect of the present invention, it is preferable that the following conditional expression is satisfied:

$$|PH - PL| < 1$$

where PH denotes a pupil position of the variable power lens system in the high magnification end state, and PL denotes a pupil position of the variable power lens system in the low magnification end state.

According to a second aspect of the present invention, there is provided a microscope comprising: a first objective lens that collects light from a sample; a second objective lens that forms a primary image based on light from the first objective lens; the variable power relay optical system according to claim 1 that forms a secondary image with zooming the primary image; and an optical modulator that is disposed at a pupil position of a variable power lens system in the variable power relay optical system.

In the second aspect of the present invention, it is preferable that the optical modulator is a phase plate.

According to a third aspect of the present invention, there is provided a microscope comprising: an illumination optical system that illuminates a sample with illumination light; and an imaging optical system that collects light from the sample and forms a sample image; the illumination optical system including the variable power relay optical system according to claim 1, a diffraction grating at a primary focal point of the variable power relay optical system, and an optical modulator at a pupil position of a variable power lens system in the variable power relay optical system.

In the third aspect of the present invention, it is preferable that the optical modulator is a phase plate.

The present invention makes it possible to provide a variable power relay optical system whose variable power lens system has a pupil disposed to the image side of the last lens surface thereof and has extremely small variation in pupil position upon zooming.

BRIEF DESCRIPTION OF THE DRAWINGS

FIG. 9 shows various aberrations of the variable power relay optical system according to Example 2 in the low magnification end state.

EMBODIMENT FOR CARRYING OUT THE INVENTION

A variable power relay optical system according to an embodiment of the present invention is explained below with reference to accompanying drawings.

First Embodiment

Figure 1:
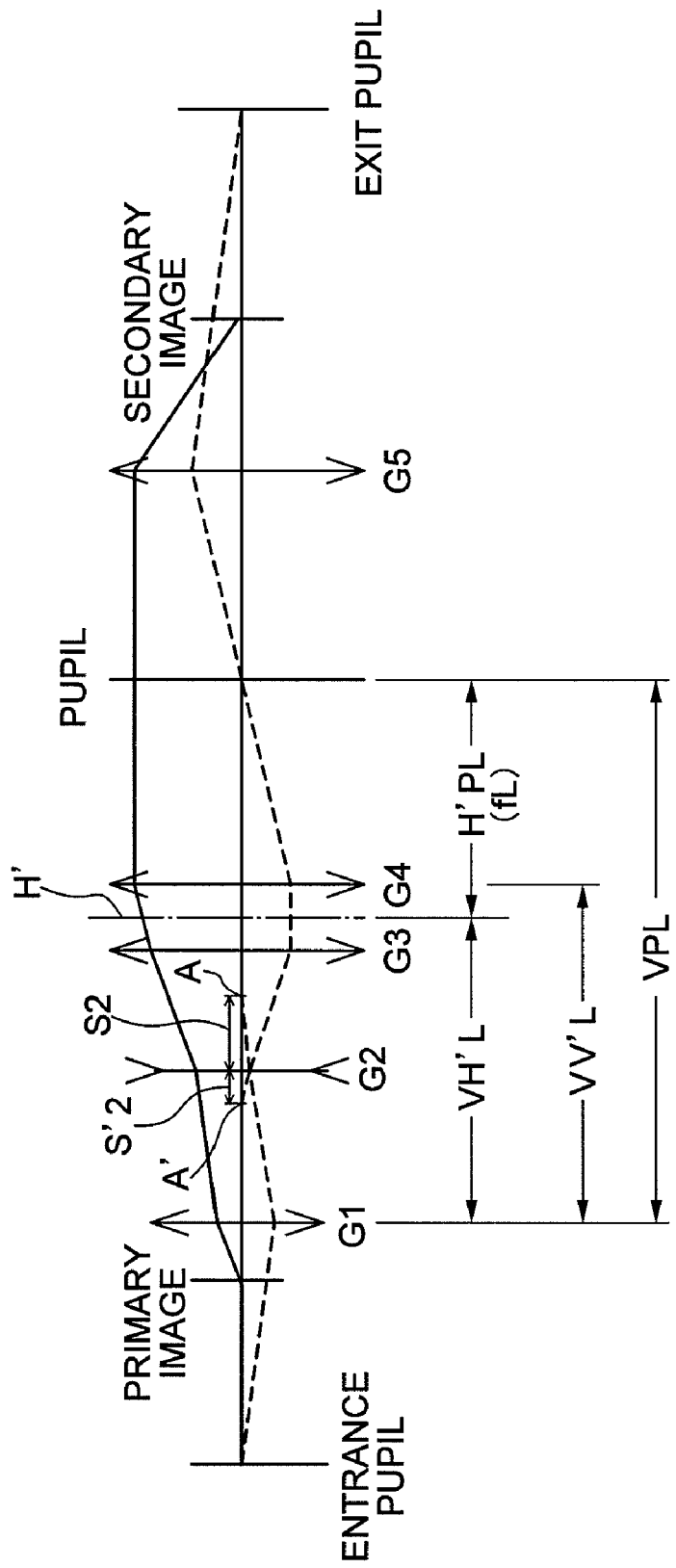
FIG. 1 is a schematic diagram explaining a basic construction of a variable power relay optical system according to a first embodiment.

FIG. 1 is a schematic diagram explaining a basic construction of a variable power relay optical system according to a first embodiment.

The variable power relay optical system shown in FIG. 1 is, for example, an optical system for forming a secondary image on a focal plane of an eyepiece on the basis of the light from a primary image formed by an objective lens of a microscope or the like.

The variable power relay optical system is composed of, in order from the primary image side, a first lens group G1 having positive refractive power, a second lens group G2 having negative refractive power, a third lens group G3 having positive refractive power, a fourth lens group G4 having positive refractive power, and a fifth lens group G5 having positive refractive power.

Here, the first lens group G1 through the fourth lens group G4 compose a variable power lens system that receives the light from the primary image to carry out zooming the secondary image. Upon zooming from a high magnification end state to a low magnification end state, a distance between the first lens group G1 and the second lens group G2, a distance between the second lens group G2 and the third lens group G3, a distance between the third lens group G3 and the fourth lens group G4 vary.

The imaging lens group G5 composes a rear lens group that forms a secondary image by converging light from the variable power lens system composed of the first lens group G1 through the fourth lens group G4.

In order to locate the exit pupil of the variable power lens system (a pupil of the variable power lens system) to the rear side of the variable power lens system, a primary principal point and a secondary principal point have to come to relatively rear side. In the present variable power relay optical system, since the second lens group having negative refractive power in the variable power lens system is located to the front side of the variable power lens system, the primary principal point and the secondary principal point of the variable power lens system can be located to the rear side of the variable power lens system.

With this lens configuration, it becomes possible to realize a variable power relay optical system having the position of the pupil of the variable power lens system locating to the image side (the secondary image side) of the last lens surface of the variable power lens system, and having extremely small variation in the position of the pupil of the variable power lens system upon zooming.

In the present variable power relay optical system, in order to suppress variation in the relative position between the position of the primary image and the position of the secondary image, the fourth lens group G4 can be moved along the optical axis. Accordingly, in the present variable power relay optical system, when the fourth lens group G4 is moved along the optical axis in a state where the principal ray emerged from each point of the primary image always converges on the same position by properly setting the magnification of the second lens group G2 and by finely adjusting the third lens group G3, the angle between the principal ray emerged from each point of the primary image and the marginal ray emerged from the same point can be constant. As a result, in the present variable power relay optical system, it becomes possible to suppress variation in relative position between the position of the primary image and that of the secondary image upon zooming.

In the present variable power relay optical system, upon zooming from the high magnification end state to the low magnification end state, the third lens group is preferably moved to the secondary image side along the optical axis. With this lens configuration, in the present variable power relay optical system, variation in relative position between the entrance pupil of the variable power relay optical system and the pupil of the variable power lens system upon zooming can be small by finely adjusting the third lens group G3 and the fourth lens group G4.

In the variable power relay optical system according to the present embodiment, when the magnification of the second lens group of the variable power relay optical system in the high magnification end state with respect to the ray crossing the optical axis at the entrance pupil and the exit pupil of the variable power relay optical system is β'2H, and the magnification of the second lens group in the low magnification end state with respect to the same ray is β'2L, the following conditional expressions (1) and (2) are preferably satisfied:

$$\beta'2L<-1 \text{ and } -1<\beta'2H \tag{1}$$

$$0.8<\beta'2L\times\beta'2H<1.25 \tag{2}.$$

Conditional expression (1) defines a condition to suppress variation in conjugate relation of pupils upon zooming.

In conditional expression (1), when β'2L<−1 is not satisfied, magnification of the second lens group G2 at pupil conjugation becomes larger than −1 over entire zoom range, so that variation in conjugate relation of the pupils upon zooming becomes large.

In conditional expression (1), when −1<β'2H is not satisfied, magnification of the second lens group G2 at pupil conjugation becomes smaller than −1 over entire zoom range, so that variation in conjugate relation of the pupils upon zooming becomes large.

Conditional expression (2) defines a condition to suppress variation in conjugate relation of pupils upon zooming.

With satisfying conditional expression (2), it becomes possible to be well-balanced between the magnification β'2L in the low magnification end state in the pupil conjugate of the second lens group G2 and the magnification β'2H in the high magnification end state in the pupil conjugate of the second lens group G2, so that variation in conjugate relation of the pupils upon zooming can be suppressed to be small.

When the product falls below the lower limit of conditional expression (2), the magnification of the second lens group G2 in the pupil conjugate relation in the low magnification end state becomes too small, and variation in pupil conjugate relation upon zooming becomes large, so that it is undesirable.

When the product exceeds the upper limit of conditional expression (2), the magnification of the second lens group G2 in the pupil conjugate relation in the high magnification end state becomes too large, and variation in pupil conjugate relation upon zooming becomes large, so that it is undesirable.

Here, in the present variable power relay optical system, the reason that variation in pupil conjugate relation upon zooming can be suppressed to be small by satisfying conditional expressions (1) and (2) is explained with reference to FIG. 1. In FIG. 1, dotted line shows a ray emerged from the center of the entrance pupil of the variable power relay optical system.

As shown by the dotted line in FIG. 1, in the present variable power relay optical system, when the entrance pupil is assumed to be an object, an image point by the first lens group G1 is A, and an image point by the second lens group G2 is A'.

The present variable power relay optical system forms an image of the image point A' formed by the second lens group G2 by means of the third lens group G3 and the fourth lens group G4, which are the rear groups. Accordingly, in the present variable power relay optical system, even if the position of the second lens group G2 varies upon zooming, when variation in the position of the image point A' is small, variation in the pupil position of the variable power lens system that is formed through the third lens group G3 and the fourth lens group G4 can be small.

Here, in the present variable power relay optical system, a focal length of the second lens group G2 is denoted by f2, as shown in FIG. 1, a distance between the second lens group G2 and the image point A is denoted by S2, a distance between the second lens group G2 and the image point A' is denoted by S'2. Then, the following expression (a) is held:

$$(1/S'2)=(1/S2)+(1/f2) \tag{a}.$$

Incidentally, the sign of the distance is positive in the direction proceeding from the entrance pupil to the exit pupil of the present variable power relay optical system shown in FIG. 1.

On the other hand, (S'2/S2) is equal to a magnification corresponding to the light ray crossing the optical axis at an entrance pupil and an exit pupil of the second lens group G2, so that the value is assumed to be β'2. Then, the following expressions (b) and (c) are obtained:

$$S'2=f2(1-\beta'2) \tag{b}$$

$$S2=-f2(1-(1/\beta'2)) \tag{c}.$$

Here, a distance L between the image point A and the image point A' becomes expression (d) from expressions (b) and (c):

$$L=S'2-S2=2f2-f2(\beta'2+(1/\beta'2)) \tag{d}.$$

When expression (d) is differentiated by β'2, the following expression (e) is obtained:

$$(dL/d\beta'2)=-f2(1-(1/\beta'2)^2) \tag{e}.$$

Expression (e) becomes (dL/dβ'2)=0 when the magnification β'2=−1, so that variation in the distance L upon zooming can be minimum.

In the present variable power relay optical system, with setting the low magnification β'2L and the high magnification β'2H to cross β'2=−1, variation in the distance L upon zooming can be minimum. Accordingly, in the present variable power relay optical system, variation in the pupil position of the variable power lens system upon zooming can be substantially zero.

Moreover, in the present variable power relay optical system, with keeping β'2H×β'2L within a given scope as shown by expression (2), at least one of the magnifications β'2H and β'2L is avoided to become far from the extreme value β'2=−1, so that variation in the distance L upon zooming is prevented from becoming too large. Accordingly, in the present variable power relay optical system, variation in the pupil position of the variable power lens system upon zooming can be substantially zero.

Moreover, in the variable power relay optical system according to the present embodiment, the following conditional expression (3) is preferably satisfied:

$$VV'L-fL<VH'L \tag{3}$$

where fL denotes a focal length of the variable power lens system in the low magnification end state, VV'L denotes a distance between a front side vertex of the first lens group and a rear side vertex of the fourth lens group, and VH'L denotes a distance between a front side vertex position of the first lens group and the secondary principal point of the variable power lens system.

Conditional expression (3) defines a condition for setting the pupil of the variable power lens system to the rear side of the variable power lens system.

When conditional expression (3) is not satisfied, in the variable power relay optical system, since the primary principal point and the secondary principal point come to front side or inside of the variable power lens system, it becomes difficult to set the pupil of the variable power lens system to rear side of the variable power lens system. When the present variable power relay optical system satisfies conditional expression (3) in the low magnification end state where the total lens length of the variable power lens system become longest, the pupil of the variable power lens system can be disposed to the rear side of the variable power lens system over entire variable magnification range.

Then, the reason that when the present variable power relay optical system satisfies conditional expression (3), the pupil of the variable power lens system can be disposed to the rear side of the variable power lens system is explained with reference to FIG. 1.

In the present variable power relay optical system shown in FIG. 1, H' denotes a secondary principal point at the low magnification end of the variable power lens system composed of the first lens group G1 through the fourth lens group G4, and H'PL denotes a distance between H' and the pupil. In the present variable power relay optical system, a light ray emerged from the center of the entrance pupil is shown by a dotted line, and a light ray emerged from the center of the primary image is shown by a solid line.

In order to dispose the pupil of the variable power lens system to the rear side of the variable power lens system, the total lens length VV'L of the variable power lens system in the low magnification end state where the total lens length of the variable power lens system becomes longest has to be shorter than the distance VPL between the front side vertex of the first lens group G1 and the pupil of the variable power lens system, so that the following conditional expression (f) has to be satisfied:

$$VV'L < VPL = VH'L + H'PL \quad (f)$$

Moreover, H'PL becomes minimum when the entrance pupil is disposed at infinity, and becomes a focal length fL of the variable power lens system. Accordingly, in order to satisfy conditional expression (f), it is sufficient to satisfy VV'L<VH'L+fL. This expression is equivalent to conditional expression (3). Accordingly, the present variable power relay optical system makes it possible to dispose the pupil of the variable power lens system to the rear side of the variable power lens system.

In the variable power relay optical system according to the present embodiment, the following conditional expression (4) is preferably satisfied:

$$|PH-PL| < 1 \quad (4)$$

where PH denotes a pupil position of the variable power lens system in the high magnification end state, and PL denotes a pupil position of the variable power lens system in the low magnification end state.

Conditional expression (4) is for keeping variation in an eyepoint position upon zooming to be small.

An image of the pupil of the variable power lens system with respect to an eyepiece is the eyepoint. In the present variable power relay optical system, with satisfying conditional expression (4), it becomes possible to make variation in the eyepoint position small, so that an observer can easily adjust the observer's eye to the eyepoint. Moreover, when a phase contrast microscope observation explained later is carried out by disposing a phase plate and the like at the pupil position of the variable power lens system, the present variable power relay optical system makes it possible to enhance contrast of the image by making the positional difference between the phase plate position and the pupil position small to reduce leakage light from the circumference of the phase plate.

In order to secure the effect of the present embodiment, in the present variable power relay optical system, it is preferable to set the upper limit of conditional expression (4) to 0.7. Accordingly, in a phase contrast microscope explained later in which a phase plate is disposed at the pupil position of the variable power lens system, the present variable power relay optical system makes it possible to prevent contrast of the observing image from decreasing. In order to further secure the effect of the embodiment, in the present variable power relay optical system, it is most preferable to set the upper limit of conditional expression (4) to 0.3. In order to still further secure the effect of the embodiment, in the present variable power relay optical system, it is most preferable to set the upper limit of conditional expression (4) to 0.1. In a structured illumination microscope explained later in which a diffraction grating is disposed at a primary focal point of the variable power lens system, the present variable power relay optical system makes it possible to reduce a shift of wavefront of diffracted light on the sample generated by the diffraction grating, increase contrast of interference fringe formed on the sample, and reduce artifact occurred on an acquired image.

In a variable power relay optical system, for example, in the high magnification end state and the low magnification end state, when PH−PL=1 mm, the above-described effect can be obtained. For example, a width of a phase plate of a phase contrast microscope is made slightly larger than a width of a ring aperture so as not to stream light through circumference thereof. Assuming the rear side numerical aperture NA of the light from the ring aperture and forming an image on the phase plate is 0.05, even if the position of the pupil is shifted by 1 mm, when the width of the phase plate is made larger by the amount of 0.05×1 mm=0.05 mm at both ends, the light does not shine through, so that contrast of the image can be enhanced.

A variable power relay optical system according to each Example of the present embodiment is explained below with reference to accompanying drawings.

EXAMPLE 1

Figure 2:
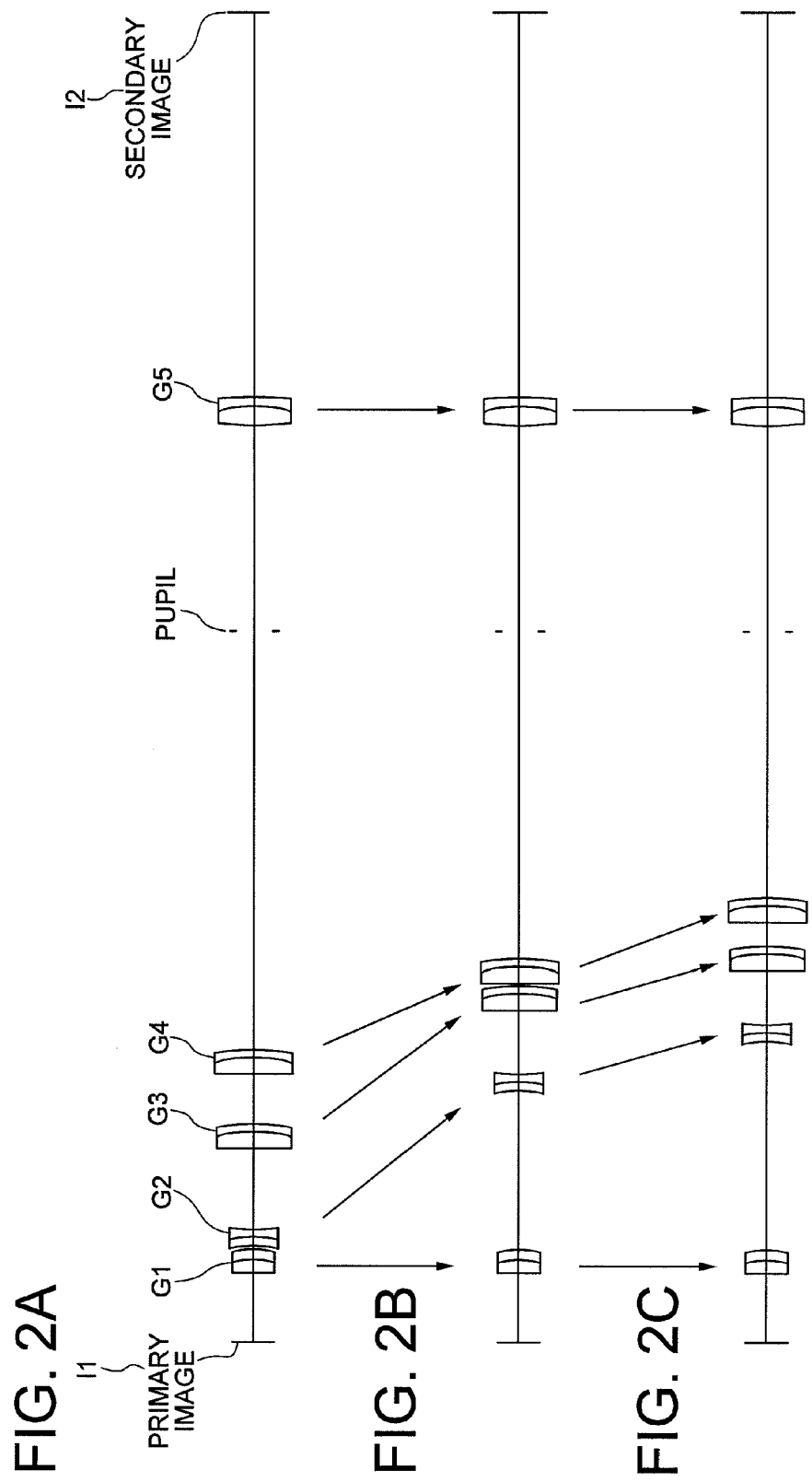
FIG. 2A is a schematic diagram showing lens configuration of a variable power relay optical system according to Example 1 in a high magnification end state.
FIG. 2B is a schematic diagram showing lens configuration of a variable power relay optical system according to Example 1 in an intermediate magnification state.
FIG. 2C is a schematic diagram showing lens configuration of a variable power relay optical system according to Example 1 in a low magnification end state.

FIG. 2A is a schematic diagram showing lens configuration of a variable power relay optical system according to Example 1 in a high magnification end state. FIG. 2B is a schematic diagram showing lens configuration of a variable power relay optical system according to Example 1 in an intermediate magnification state. FIG. 2C is a schematic diagram showing lens configuration of a variable power relay optical system according to Example 1 in a low magnification end state.

The variable power relay optical system shown in FIGS. 2A through 2C is, for example, an optical system for forming a secondary image I2 on a focal plane of an eyepiece on the basis of the light from a primary image I1 formed by an objective lens of a microscope.

In FIG. 2A, the variable power relay optical system is composed of, in order from the primary image I1 side, a first lens group G1 having positive refractive power, a second lens group G2 having negative refractive power, a third lens group G3 having positive refractive power, a fourth lens group G4 having positive refractive power, and an imaging lens group G5 having positive refractive power. Although reference symbols are attached only in FIG. 2A, the same holds the others.

The first lens group G1 is composed of a cemented lens constructed by a positive meniscus lens having a concave surface facing the primary image I1 side cemented with a negative meniscus lens.

The second lens group G2 is composed of a cemented lens constructed by a positive meniscus lens having a concave surface facing the primary image I1 side cemented with a double concave negative lens.

The third lens group G3 is composed of a cemented lens constructed by a positive meniscus lens having a concave surface facing the primary image I1 side cemented with a negative meniscus lens.

The fourth lens group G4 is composed of a cemented lens constructed by a double convex positive lens cemented with a negative meniscus lens.

The imaging lens group G5 is composed of a cemented lens constructed by a double convex positive lens cemented with a negative meniscus lens.

A variable power lens system is composed of the first lens group G1 through the fourth lens group G4, and the second lens group G2, the third lens group G3, and the fourth lens group G4 are moved along an optical axis upon zooming.

The imaging lens G5 forms the secondary image I2 on the basis of light flux passing through the first lens group G1 through the fourth lens group G4 composing the variable power lens system, which is also through the primary image I1. The variable power relay optical system shown in FIGS. 2A through 2C is made to be a telecentric optical system to the object side by adjusting refractive power of each lens group. Accordingly, the position of the entrance pupil is located at infinity.

Various values associated with the variable power relay optical system according to Example 1 are listed in the following Table 1.

In Surface Data in Table 1, surface number 0 is the primary image plane, the other surface numbers are respective surface numbers counted from the primary image side, r denotes a radius of curvature, d denotes a distance between lens surfaces, nd denotes a refractive index at d-line (wavelength λ=587.6 nm), vd denotes an Abbe number at d-line (wavelength λ=587.6 nm), (variable) denotes a variable distance between lens surfaces, and B.F. denotes a back focal length. Refractive index of air nd=1.000000 is omitted. "∞" in column r of radius of curvature denotes a plane surface.

In Surface Distance, Mag. Denotes magnification, di denotes a variable distance between lens surfaces at a surface number "i", "B.F." denotes a back focal length, and "I1 to P" denotes a distance between the primary image plane and the pupil with respect to high magnification end state "H", intermediate magnification state "M", and low magnification end state "L" which are respectively listed.

In Magnification of Each Lens Group from Primary Image to Secondary Image, total magnification "Mag.", and magnification of each lens group with respect to high magnification end state "H", intermediate magnification state "M" and low magnification end state "L" are shown.

In Magnification of Each Lens Group From Entrance Pupil to Exit Pupil, total Magnification "Mag.", and magnification of each lens group with respect to high magnification end state "H", intermediate magnification state "M" and low magnification end state "L" are shown.

In Principal Point Position of Variable Power lens system, "G1-PP" which is a distance from a front vertex of the first lens group to the primary principal point, "G1-SP" which is a distance from a front vertex of the first lens group to the secondary principal point, and "G1-G4" which is a distance from the front vertex of the first lens group to a rear vertex of the fourth lens group with respect to high magnification end state "H", intermediate magnification state "M" and low magnification end state "L" are shown.

In Values for Conditional Expressions, respective values for conditional expressions are shown.

In respective tables for various values, "mm" is generally used for the unit of length such as the focal length f, the radius of curvature r and the distance to the next lens surface d. However, since similar optical performance can be obtained by an optical system proportionally enlarged or reduced its dimension, the unit is not necessarily limited to "mm", and any other suitable unit can be used. The explanation of reference symbols is the same in the other Examples, so that duplicated explanations are omitted.

TABLE 1

[Surface Data]

| surface number | r | d | nd | vd |
|---|---|---|---|---|
| 0 | ∞ | 20.00 | (Primary Image) | |
| 1 | −40.45250 | 4.00 | 1.7859000 | 44.18 |
| 2 | −29.11360 | 3.00 | 1.8038400 | 33.89 |
| 3 | −29.95690 | (Variable) | | |
| 4 | −43.57070 | 3.00 | 1.7552000 | 27.51 |
| 5 | −22.02220 | 2.00 | 1.7668400 | 46.79 |
| 6 | 102.94060 | (Variable) | | |
| 7 | −601.88160 | 5.00 | 1.7880000 | 47.38 |
| 8 | −31.76440 | 2.00 | 1.7173600 | 28.55 |
| 9 | −67.53210 | (Variable) | | |
| 10 | 243.96810 | 5.00 | 1.7880000 | 47.38 |
| 11 | −43.85240 | 2.00 | 1.7950400 | 28.55 |
| 12 | −175.62640 | (Variable) | | |
| 13 | ∞ | 61.80 | | |
| 14 | 71.44500 | 5.80 | 1.5168000 | 64.10 |
| 15 | −52.46100 | 3.00 | 1.6476900 | 33.88 |
| 16 | −176.75800 | B.F. | | |
| | ∞ | | (Secondary Image) | |

| | H | M | L |
|---|---|---|---|

[Surface Distance]

| | | | |
|---|---|---|---|
| Mag. | −1.500 | −1.000 | −0.857 |
| d3 | 1.00 | 47.03 | 63.09 |
| d6 | 24.29 | 19.16 | 16.63 |
| d9 | 14.82 | 1.00 | 7.61 |
| D12 | 127.47 | 100.39 | 80.26 |
| B.F. | 115.82 | 115.82 | 115.82 |
| I1 to P | 213.58 | 213.58 | 213.58 |

[Magnification of Each Lens Group from Primary Image to Secondary Image]

| | | | |
|---|---|---|---|
| Mag. | −1.500 | −1.000 | −0.857 |
| G1 | 1.389 | 1.389 | 1.389 |
| G2 | 0.511 | 0.319 | 0.282 |
| G3 | 2.336 | 2.495 | 2.419 |
| G4 | 426.334 | 421.440 | 421.912 |
| G5 | −0.002 | −0.002 | −0.002 |

[Magnification of Each Lens Group from Entrance Pupil to Exit Pupil]

| | | | |
|---|---|---|---|
| Mag. | −1.500 | −1.000 | −0.857 |
| G1 | 0.000 | 0.000 | 0.000 |
| G2 | −0.479 | −1.105 | −2.031 |
| G3 | −56.176 | −4.160 | −1.592 |
| G4 | 0.026 | 0.230 | 0.382 |
| G5 | 2.112 | 2.112 | 2.112 |

[Principal Point Position of Variable power lens system]

| | | | |
|---|---|---|---|
| Mag. | −1.500 | −1.000 | −0.857 |
| G1-PP | 59.839 | 99.768 | 119.699 |
| G1-SP | 113.631 | 73.556 | 53.531 |
| G1-G4 | 66.110 | 93.189 | 113.320 |

TABLE 1-continued

[Values for Conditional Expressions]

(1) β'2L = −2.031; β'2H = −0.479
(2) β'2L × β'2H = 0.973
(3) VV'L − fL = −26.68
(4) |PH − PL| = 0

Figure 3:
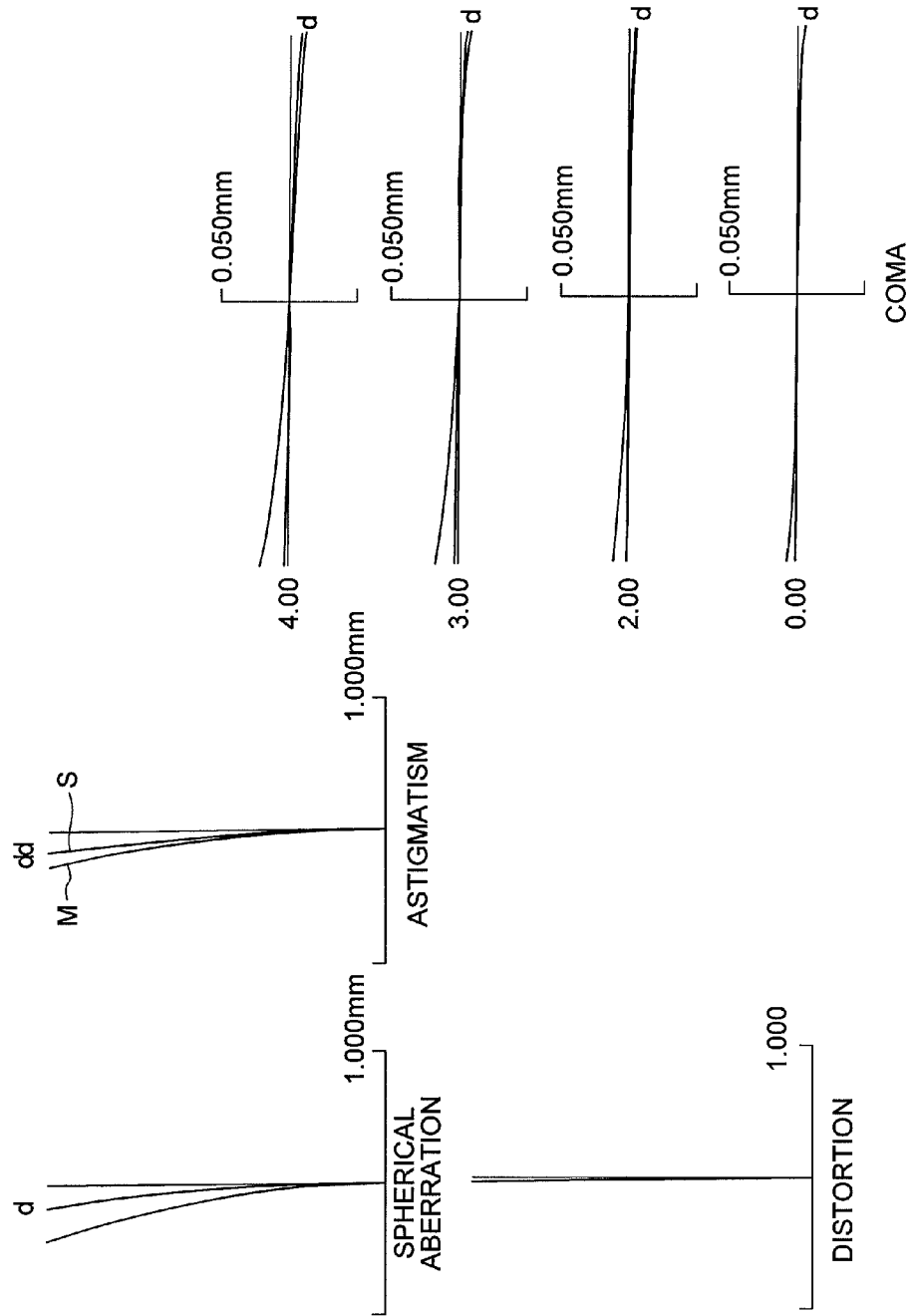
FIG. 3 shows various aberrations of the variable power relay optical system according to Example 1 at d-line in the high magnification end state.
Figure 4:
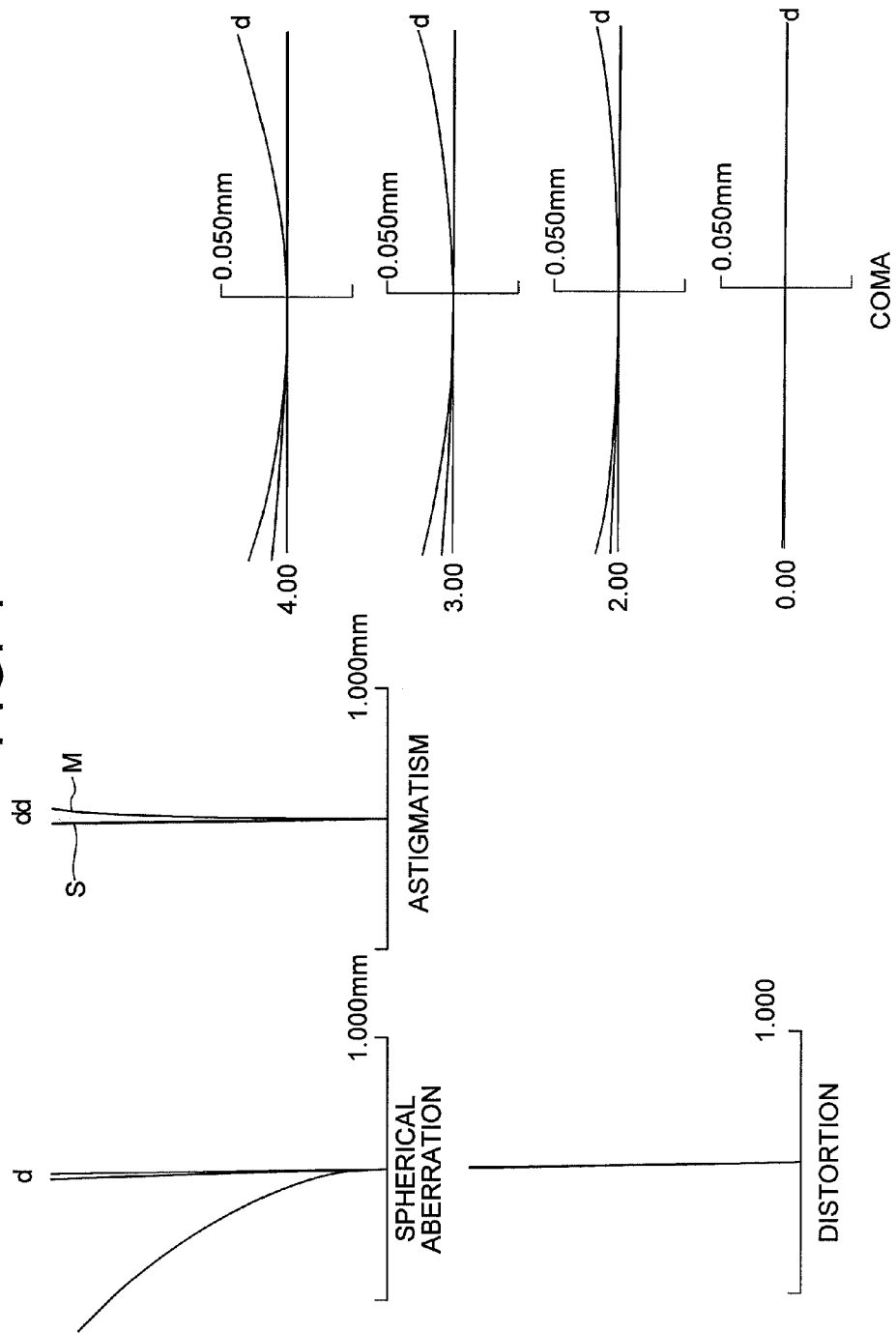
FIG. 4 shows various aberrations of the variable power relay optical system according to Example 1 at d-line in the intermediate magnification state.
Figure 5:
FIG. 5 shows various aberrations of the variable power relay optical system according to Example 1 at d-line in the low magnification end state.

FIG. 3 shows various aberrations of the variable power relay optical system according to Example 1 at d-line in the high magnification end state. FIG. 4 shows various aberrations of the variable power relay optical system according to Example 1 at d-line in the intermediate magnification state. FIG. 5 shows various aberrations of the variable power relay optical system according to Example 1 in the low magnification end state.

In respective graphs showing astigmatism and coma, aberration amount of sine condition is shown. In respective graphs showing coma, aberration value for each image height (unit: mm) is shown. In respective graphs showing astigmatism, S denotes sagittal image plane, and M denotes meridional image plane. In the following Examples, the same symbols are used, so that duplicated explanations are omitted.

As is apparent from the respective graphs, the variable power relay optical system according to Example 1 shows superb optical performance as a result of good corrections to various aberrations. With reference to the distance between lens surfaces, the distance between the primary image plane and the pupil is always 213.58. In other words, in Example 1, it is understood that variation in pupil position of the variable power lens system with respect to the entrance pupil upon zooming is suppressed. At the same time, it is understood that the pupil of the variable power lens system is disposed to the rear side of the variable power lens system.

EXAMPLE 2

Figure 6:
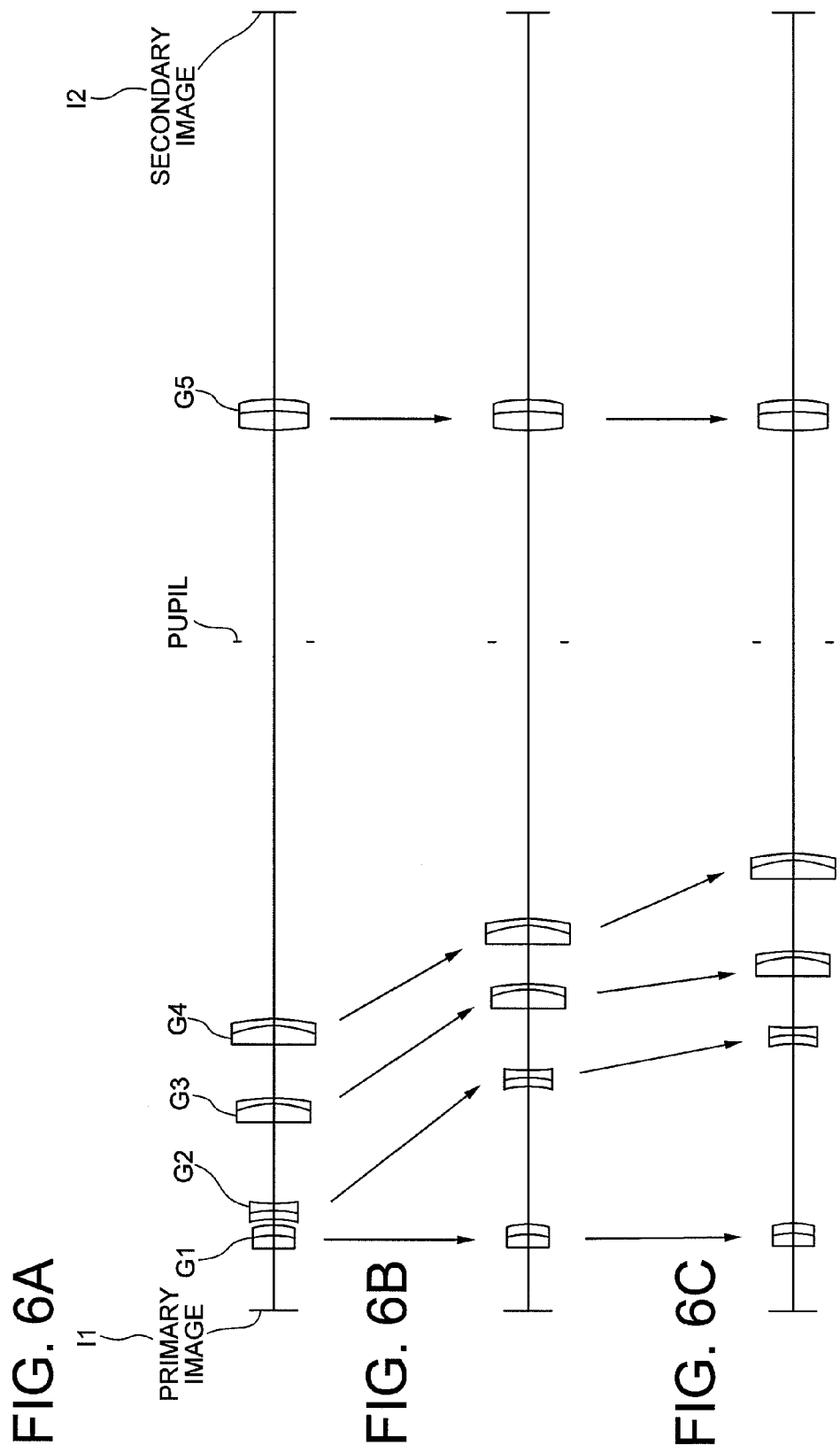
FIG. 6A is a schematic diagram showing lens configuration of a variable power relay optical system according to Example 2 in a high magnification end state.
FIG. 6B is a schematic diagram showing lens configuration of a variable power relay optical system according to Example 2 in an intermediate magnification state.
FIG. 6C is a schematic diagram showing lens configuration of a variable power relay optical system according to Example 2 in a low magnification end state.

FIG. 6A is a schematic diagram showing lens configuration of a variable power relay optical system according to Example 2 in a high magnification end state. FIG. 6B is a schematic diagram showing lens configuration of a variable power relay optical system according to Example 2 in an intermediate magnification state. FIG. 6C is a schematic diagram showing lens configuration of a variable power relay optical system according to Example 2 in a low magnification end state.

The variable power relay optical system shown in FIGS. 6A through 6C is, for example, an optical system for forming a secondary image I2 on a focal plane of an eyepiece on the basis of the light from a primary image I1 formed by an objective lens of a microscope.

In FIG. 6A, the variable power relay optical system is composed of, in order from the primary image I1 side, a first lens group G1 having positive refractive power, a second lens group G2 having negative refractive power, a third lens group G3 having positive refractive power, a fourth lens group G4 having positive refractive power, and an imaging lens group G5 having positive refractive power. Although reference symbols are attached only in FIG. 6A, the same holds the others.

The first lens group G1 is composed of a cemented lens constructed by a positive meniscus lens having a concave surface facing the primary image I1 side cemented with a negative meniscus lens.

The second lens group G2 is composed of a cemented lens constructed by a positive meniscus lens having a concave surface facing the primary image I1 side cemented with a double concave negative lens.

The third lens group G3 is composed of a cemented lens constructed by a positive meniscus lens having a concave surface facing the primary image I1 side cemented with a negative meniscus lens.

The fourth lens group G4 is composed of a cemented lens constructed by a positive meniscus lens having a concave surface facing the primary image I1 side cemented with a negative meniscus lens.

The imaging lens group G5 is composed of a cemented lens constructed by a double convex positive lens cemented with a negative meniscus lens.

A variable power lens system is composed of the first lens group G1 through the fourth lens group G4, and the second lens group G2, the third lens group G3, and the fourth lens group G4 are moved along an optical axis, upon zooming.

The imaging lens G5 forms the secondary image I2 on the basis of parallel light flux varied through the first lens group G1 through the fourth lens group G4 that forms the variable power lens system. The variable power relay optical system shown in FIGS. 6A through 6C is also made to be a telecentric optical system to the object side. Accordingly, the position of the entrance pupil is located at infinity.

Various values associated with the variable power relay optical system according to Example 2 are listed in the following Table 2.

TABLE 2

[Surface Data]

| surface number | r | d | nd | vd |
|---|---|---|---|---|
| 0 | ∞ | 18.06 | (Primary Image) | |
| 1 | −41.10414 | 4.00 | 1.7859000 | 44.18 |
| 2 | −27.57384 | 3.00 | 1.8038400 | 33.89 |
| 3 | −29.09286 | (Variable) | | |
| 4 | −42.66255 | 3.00 | 1.7552000 | 27.51 |
| 5 | −23.02371 | 2.00 | 1.7668400 | 46.79 |
| 6 | 96.55612 | (Variable) | | |
| 7 | −264.10341 | 5.00 | 1.7880000 | 47.38 |
| 8 | −29.63222 | 2.00 | 1.7173600 | 29.52 |
| 9 | −60.22013 | (Variable) | | |
| 10 | −1228.31671 | 5.00 | 1.7880000 | 47.38 |
| 11 | −35.77040 | 2.00 | 1.7950400 | 28.55 |
| 12 | −94.06200 | (Variable) | | |
| 13 | ∞ | 61.80000 | | |
| 14 | 71.44500 | 5.80000 | 1.5168000 | 64.12 |
| 15 | −52.46100 | 3.00000 | 1.6476900 | 33.79 |
| 16 | −176.75800 | B.F. | | |
| | ∞ | | (Secondary Image) | |

| | H | M | L |
|---|---|---|---|
| [Surface Distance] | | | |
| Mag. | −1.50000 | −1.00000 | −0.85710 |
| d3 | 1.93 | 40.83 | 53.14 |
| d6 | 24.06 | 18.10 | 14.83 |
| d9 | 15.93 | 11.91 | 22.20 |
| d12 | 127.59 | 98.67 | 79.34 |
| B.F. | 115.82 | 115.82 | 115.82 |
| I1 to P | 213.52 | 213.52 | 213.52 |
| [Magnification of Each Lens Group from Primary Image to Secondary Image] | | | |
| Mag. | −1.500 | −1.000 | −0.857 |
| G1 | 1.400 | 1.400 | 1.400 |
| G2 | 0.515 | 0.336 | 0.303 |
| G3 | 2.272 | 2.318 | 2.201 |
| G4 | 411.168 | 419.772 | 421.714 |
| G5 | −0.002 | −0.002 | −0.002 |
| [Magnification of Each Lens Group from Entrance Pupil to Exit Pupil] | | | |

TABLE 2-continued

| Mag. | -1.500 | -1.000 | -0.857 |
|---|---|---|---|
| G1 | 0.000 | 0.000 | 0.000 |
| G2 | -0.554 | -1.296 | -2.250 |
| G3 | -49.648 | -3.683 | -1.550 |
| G4 | 0.029 | 0.249 | 0.399 |
| G5 | 2.112 | 2.112 | 2.112 |

[Principal Point Position of Variable power lens system]

| Mag. | -1.500 | -1.000 | -0.857 |
|---|---|---|---|
| G1-PP | 61.779 | 101.680 | 121.838 |
| G1-SP | 115.502 | 75.487 | 54.984 |
| G1-G4 | 67.933 | 96.853 | 116.176 |

[Values for Conditional Expressions]

Figure 7:
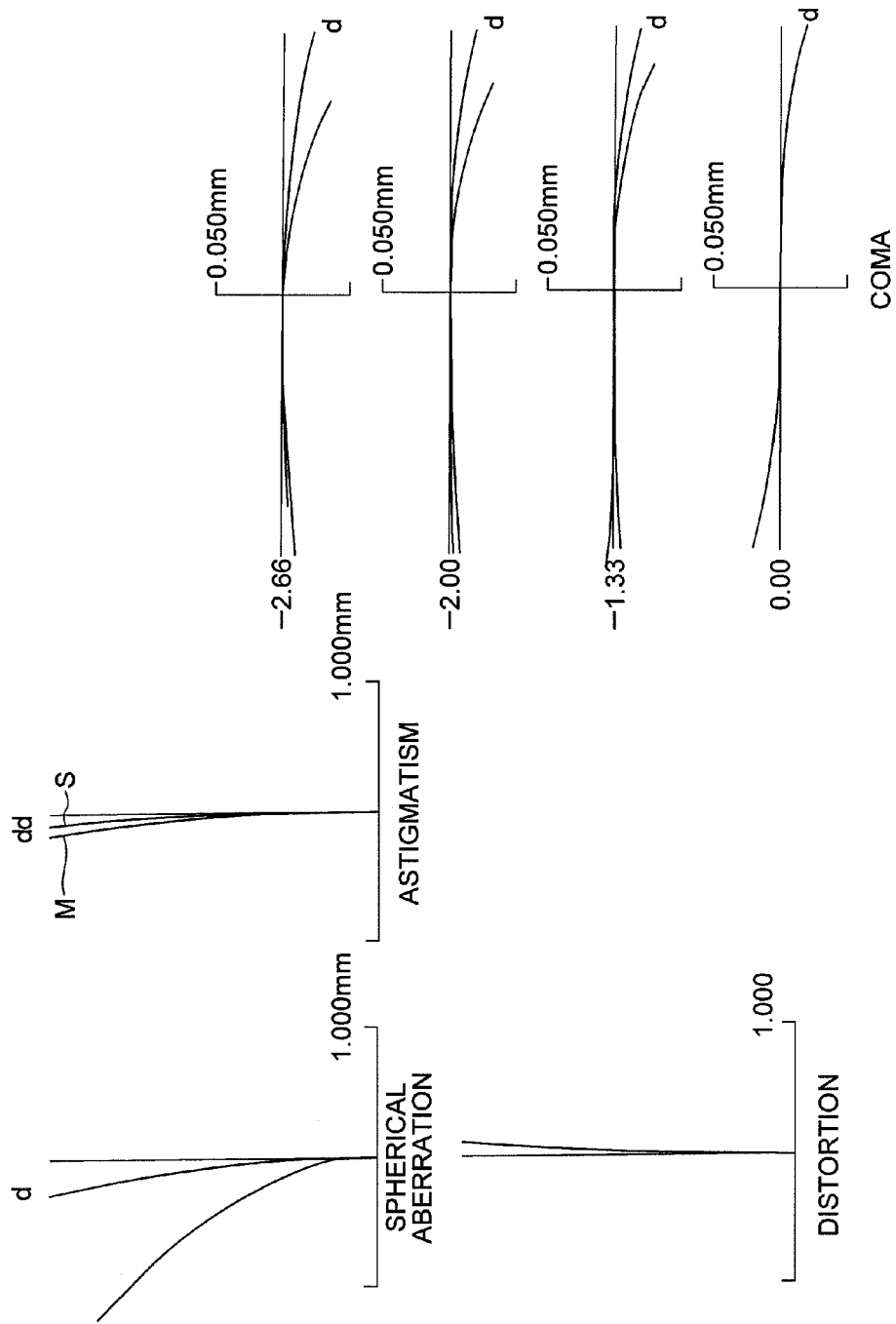
FIG. 7 shows various aberrations of the variable power relay optical system according to Example 2 at d-line in the high magnification end state.
Figure 8:
FIG. 8 shows various aberrations of the variable power relay optical system according to Example 2 at d-line in the intermediate magnification state.

(1) $\beta'2L = -2.250; \beta'2H = -0.554$
(2) $\beta'2L \times \beta'2H = 1.247$
(3) $VV'L - fL = -23.82$
(4) $|PH - PL| = 0$ FIG. 7 shows various aberrations of the variable power relay optical system according to Example 2 at d-line in the high magnification end state. FIG. 8 shows various aberrations of the variable power relay optical system according to Example 2 at d-line in the intermediate magnification state. FIG. 9 shows various aberrations of the variable power relay optical system according to Example 2 in the low magnification end state.

As is apparent from the respective graphs, the variable power relay optical system according to Example 2 shows superb optical performance as a result of good corrections to various aberrations. With reference to the distance between lens surfaces, the distance between the primary image plane and the pupil is always 213.52. In other words, in Example 2, it is understood that variation in pupil position of the variable power lens system with respect to the entrance pupil upon zooming is suppressed. At the same time, it is understood that the pupil of the variable power lens system is disposed to the rear side of the variable power lens system.

Then, a microscope equipped with the variable power relay optical system according to the first embodiment is explained with reference to accompanying drawings.

Second Embodiment

Figure 10A:
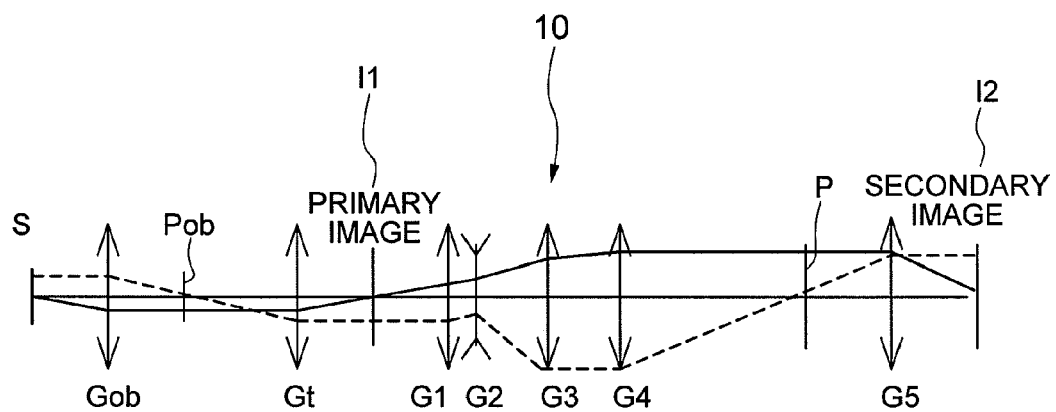
FIG. 10A is a schematic diagram showing lens configuration of a microscope according to a second embodiment in a high magnification end state.
Figure 10B:
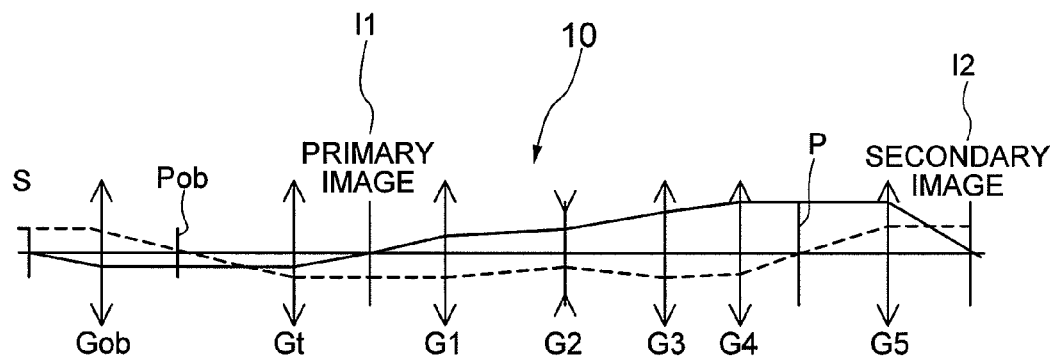
FIG. 10B is a schematic diagram showing lens configuration of the microscope according to the second embodiment in a low magnification end state.

FIG. 10A is a schematic diagram showing lens configuration of a microscope according to a second embodiment in a high magnification end state. FIG. 10B is a schematic diagram showing lens configuration of a microscope according to the second embodiment in a low magnification end state.

The microscope according to the second embodiment is an external phase contrast microscope 10 equipped with the variable power relay optical system according to the first embodiment. In FIGS. 10A and 10B, the solid line shown is a light ray regarding image conjugate relation between a sample S, a primary image I1 and a secondary image I2, and the dotted line is a light ray regarding pupil conjugate relation between a pupil Pob of a first objective lens Gob and a pupil P of a variable power lens system composed of a first lens group G1 through a fourth lens group G4.

In FIGS. 10A and 10B, as shown by the solid line light from the sample becomes parallel light by the first objective lens Gob, passes through the pupil Pob of the first objective lens Gob, and forms the primary image I1 by a second objective lens Gt. A light flux emerged from each point of the primary image I1 passes through the first lens group G1 through the fourth lens group G4 of the variable power lens system to become parallel light, passes through the pupil P of the variable power lens system, and forms the secondary image I2 by a fifth lens group G5, which is an imaging lens and disposed rear side thereof.

The external phase contrast microscope 10 relays the pupil Pob of the first objective lens Gob by the second objective lens Gt and the first lens group G1 through the fourth lens group G4 of the variable power lens system, forms a pupil image P to the secondary image side of the fourth lens group G4 of the variable power lens system, and modulates contrast of an image by a phase plate disposed at the position of the pupil image P. In this manner, the external phase contrast microscope 10 is constructed.

A conventional external phase contrast microscope has the following drawbacks. Usually, a microscope can easily change magnification by changing a second objective lens having different focal length, which converges parallel light from the first objective lens. However, in an external phase contrast microscope, when a focal length of the second objective lens is changed, the position of the pupil image of the objective lens varies, so that a mechanism capable of varying and holding the position of the phase plate each time becomes necessary. Accordingly, there has been a drawback that a phase contrast observation cannot be carried out with changing magnification.

When the variable power relay optical system according to the first embodiment is used, the position of the pupil P of the variable power lens system conjugate with the pupil Pob of the first objective lens Gob does not vary upon zooming. Moreover, since the pupil P of the variable power lens system is located to the rear side (secondary image side) of the first lens group G1 through the fourth lens group G4 of the variable power lens system, when the phase plate is disposed at the position, it becomes possible to carry out phase contrast observation with easily changing magnification by the variable power lens system.

In this manner, in the external phase contrast microscope 10 according to the second embodiment, even if magnification is varied from the high magnification end state shown in FIG. 10A to the low magnification end state shown in FIG. 10B, the position of the pupil P of the variable power lens system conjugated with the pupil Pob of the first objective lens Gob is scarcely varied. Accordingly, with disposing a phase plate at the position of the pupil P of the variable power lens system, excellent contrast can be obtained from high magnification end state to low magnification end state. Moreover, since the pupil P of the variable power lens system can be formed at the rear side of the first lens group G1 through the fourth lens group G4 of the variable power lens system, it does not interfere with a lens upon zooming. Incidentally, the microscope 10 may be an upright microscope or an inverted microscope. An illumination to the sample may be a transmission illumination or an epi-illumination.

Third Embodiment

Figure 11A:
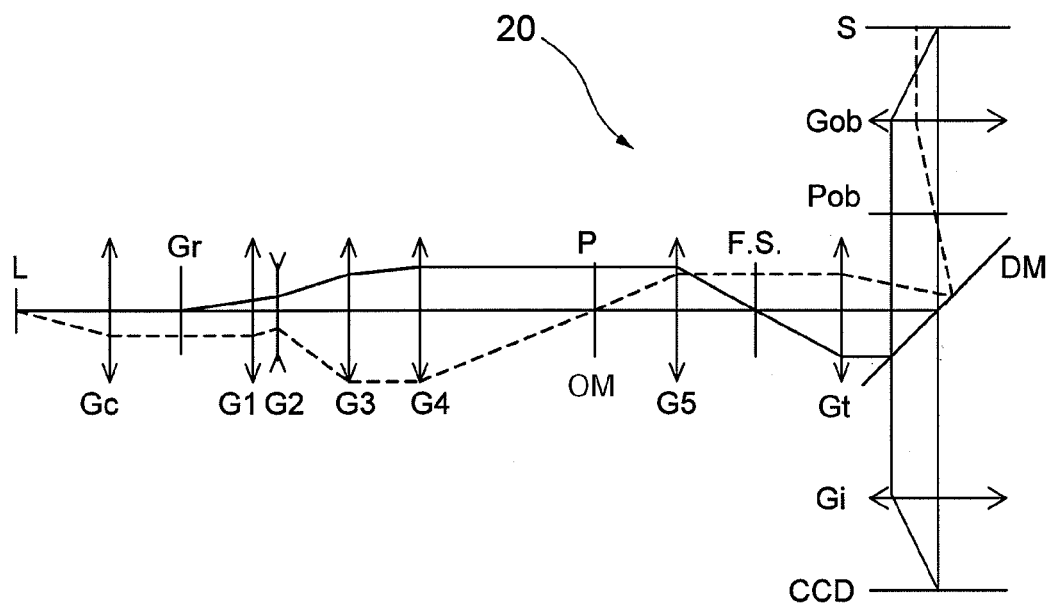
FIG. 11A is a schematic diagram showing lens configuration of a structured illumination microscope according to a third embodiment in a high magnification end state.
Figure 11B:
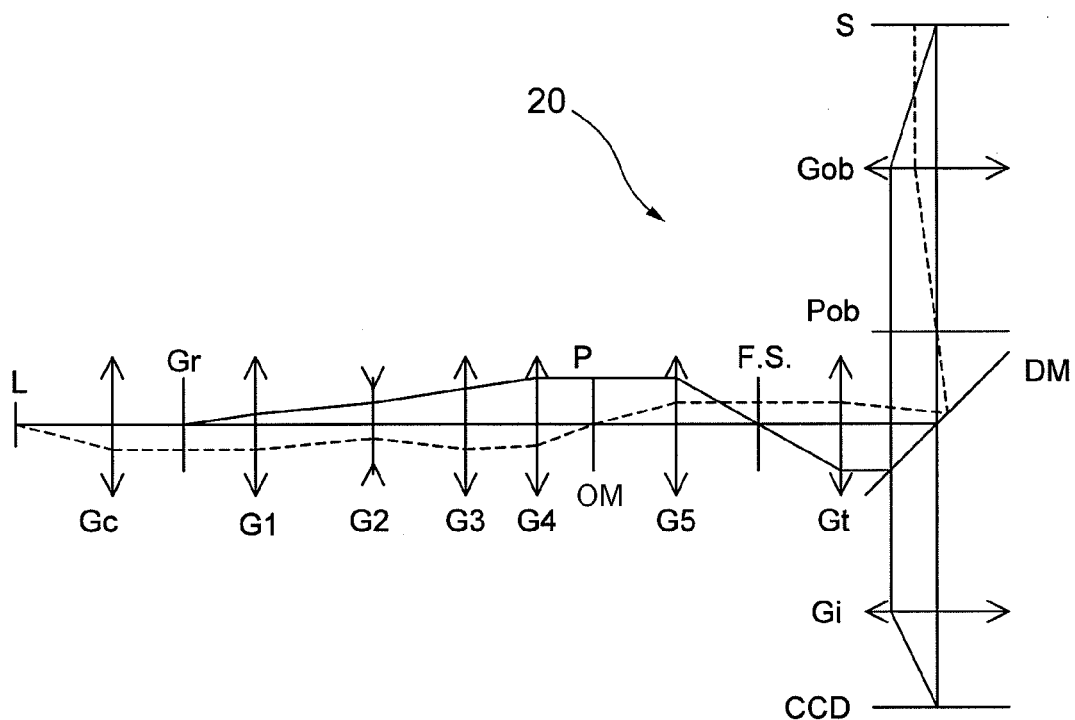
FIG. 11B is a schematic diagram showing lens configuration of the structured illumination microscope according to the third embodiment in a low magnification end state.

FIG. 11A is a schematic diagram showing lens configuration of a structured illumination microscope according to a third embodiment in a high magnification end state. FIG. 11B is a schematic diagram showing lens configuration of the structured illumination microscope according to the third embodiment in a low magnification end state.

The structured illumination microscope 20 according to the third embodiment is equipped with the variable power relay optical system according to the first embodiment as an illumination optical system. In FIGS. 11A and 11B, a solid line is a light ray showing a conjugate relation between a diffraction grating Gr and a sample S, and a dotted line is a light ray showing a conjugate relation between a light source L and a pupil Pob of the objective lens Gob.

In FIGS. 11A and 11B, the variable power relay optical system is composed of the first lens group G1 through the fifth lens group G5, as shown by the solid line, the light ray from the light source L becomes parallel light flux by a collector lens Gc, and illuminates the diffraction grating Gr disposed at a primary focal point of the variable power relay optical system. The light ray from the diffraction grating Gr is performed zooming by the first lens group G1 through the fourth lens group G4 of the variable power lens system, and forms an image at a position of a field stop F.S. by the fifth lens group G5, which is an imaging lens and disposed to the rear side thereof. The light ray from the image becomes parallel light ray again by a second objective lens Gt, is reflected by a dichroic mirror DM to pass through the pupil Pob of the first objective lens Gob, and forms an image at the sample S by the first objective lens Gob.

The light from the sample S is collected by the first objective lens Gob, passes through the pupil Pob, passes through the dichroic mirror DM, and forms an image on an imaging device CCD by an imaging lens Gi. The image captured by the CCD is observed by an unillustrated monitor and the like. In this manner, the structured illumination microscope 20 is constructed.

The structured illumination microscope 20 is a publicly known microscope (for example, see Japanese Patent Application Laid-Open No. 11-242189) that carries out a super resolution observation of a sample to be observed such as a biological sample by spatially modulating illumination light. In the microscope, a spatial frequency of a structure of a sample to be observed is modulated by an illumination light spatially modulated by a spatial modulator such as a diffraction grating, so that spatial frequency information exceeding resolution limit contributes to the microscope optical system to form an image. In this instance, in order to illuminate with illumination light spatially modulated by a suitable modulation frequency corresponding to a magnification and NA of the objective lens, it is necessary to project a spatial modulator onto the sample plane with a suitable magnification.

For example, when an objective lens Gob with a high magnification is used, the magnification between the field stop F.S. and the sample S becomes small, so that the frequency (modulation frequency) of the diffraction grating projected on the sample becomes high. When the modulation frequency exceeds the resolution limit of the objective lens, a super resolution image cannot be restored. Accordingly, the modulation frequency has to be lowered by raising the magnification of the variable power relay optical system.

On the other hand, when an objective lens Gob with a low magnification is used, the magnification between the field stop F.S. and the sample S becomes large, so that the modulation frequency becomes low. When the modulation frequency is low with respect to the resolution limit of the objective lens, the effect of sufficient super resolution cannot be obtained. Accordingly, the modulation frequency has to be raised by lowering the magnification of the variable power relay optical system.

A conventional structured illumination microscope disposes a projection lens unable to vary magnification instead of the variable power lens system, and when an objective lens is changed, the projection magnification is adjusted by changing the projection lens with a different focal length. In this case, there has been a drawback that the illumination optical system has to be readjusted whenever the objective lens is changed.

In the structured illumination microscope 20 according to the third embodiment, with using the variable power relay optical system according to the first embodiment in the illumination optical system, it becomes possible to change the projection magnification of the illumination optical system upon changing the first objective lens Gob.

In the structured illumination microscope 20, since the position of the exit pupil of the variable power relay optical system hardly varies upon zooming, telecentricity scarcely changes.

In the structured illumination microscope 20, since the pupil P of the variable power lens system composed of the first lens group G1 through the fourth lens group G4 is located to the rear side of the first lens group G1 through the fourth lens group G4 of the variable power lens system, it becomes possible to freely operate the shape of interference fringe formed on the sample by disposing an optical modulator OM at the place to modulate phase and intensity of the direct light and diffracted light generated by the diffraction grating. In this case also, the present embodiment can be used. For example, when a spatial filter that blocks diffracted light generated by the diffraction grating except ±1st order of diffracted light is disposed at the pupil P of the variable power lens system, two beam interference fringes can be formed on the sample plane. On this occasion, by shifting the phase of the first diffracted light with disposing a phase plate on a region where the first order diffracted light passes on the pupil P of the variable power lens system, the phase of the interference fringe formed on the sample can be shifted by desired amount.

As described above, in the variable power relay optical system according to the present embodiment, the pupil of the variable power lens system can be fixed to a given position located to the rear side of the variable power lens system upon zooming without loosing positional relation between the primary image and the secondary image.

Moreover, with adopting the variable power relay optical system to a microscope, it becomes possible to easily carry out zooming in a microscope such as an external phase contrast microscope which is necessary to dispose an optical modulator on the pupil of the microscope.

In a structured illumination microscope in which the variable power relay optical system is adapted to an illumination optical system, the optimum projection magnification of the diffraction grating corresponding to changing objective lens can be easily obtained without replacing an optical member. Incidentally, in the above-described embodiment, although each lens group is composed of a plurality of lenses, each lens group may be constructed by a single lens. It is needless to say that the single lens may be a cemented lens constructed by a plurality of lenses cemented with each other.

The above-described embodiment only shows a specific example, so that the present invention is not limited to the above-described constructions and shapes, and suitable modifications and alterations can be possible within scope of the present invention.

What is claimed is:

1. A variable power relay optical system that forms a secondary image based on light from a primary image, comprising:
    a variable power lens system that carries out zooming the secondary image based on the light from the primary image; and
    a rear lens group that forms the secondary image based on the light passing through the variable power lens system;
    the variable power lens system consisting of, in order from the primary image side, a first lens group having positive refractive power, a second lens group having negative refractive power, a third lens group having positive refractive power, and a fourth lens group having positive refractive power, upon zooming from a high magnification end state to a low magnification end state, the fourth lens group being moved to the secondary image side, and a distance between the first lens group and the second lens group increasing, upon zooming the variable power lens system, positions of the primary image and the secondary image, an entrance pupil of the variable power relay optical system, a pupil of the variable power lens system, an exit pupil of the variable power relay optical system being substantially kept constant, and the pupil of the variable power lens system being disposed to the secondary image side of the last surface of the variable power lens system.

2. The variable power relay optical system according to claim 1, wherein the third lens group is moved to the secondary image side along an optical axis upon zooming from the high magnification end state to the low magnification end state.

3. The variable power relay optical system according to claim 1, wherein the following conditional expressions are satisfied:

$$\beta'2L < -1 \text{ and } -1 < \beta'2H$$

$$0.8 < \beta'2L \times \beta'2H < 1.25$$

where $\beta'2H$ denotes a magnification of the second lens group in the high magnification end state with respect to a light ray crossing the optical axis at the entrance pupil and the exit pupil of the variable power relay optical system, and $\beta'2L$ denotes a magnification of the second lens group in the low magnification end state with respect to the light ray.

4. The variable power relay optical system according to claim 1, wherein the following conditional expression is satisfied:

$$VV'L - fL < VH'L$$

where fL denotes a focal length of the variable power lens system in the low magnification end state, VV'L denotes a distance between a front vertex of the first lens group and a rear vertex of the fourth lens group in the low magnification end state, and VH'L denotes a distance between the front vertex of the first lens group and a secondary principal point of the variable power lens system in the low magnification end state.

5. The variable power relay optical system according to claim 1, wherein the following conditional expression is satisfied:

$$|PH - PL| < 1$$

where PH denotes a pupil position of the variable power lens system in the high magnification end state, and PL denotes a pupil position of the variable power lens system in the low magnification end state.

6. A microscope comprising:
a first objective lens that collects light from a sample;
a second objective lens that forms a primary image based on light from the first objective lens;
the variable power relay optical system according to claim 1 that forms a secondary image with zooming the primary image; and
an optical modulator that is disposed at a pupil position of a variable power lens system in the variable power relay optical system.

7. The microscope according to claim 6, wherein the optical modulator is a phase plate.

8. A microscope comprising:
an illumination optical system that illuminates a sample with illumination light; and
an imaging optical system that collects light from the sample and forms a sample image;
the illumination optical system including the variable power relay optical system according to claim 1, a diffraction grating disposed at a primary focal point of the variable power relay optical system, and an optical modulator disposed at a pupil position of a variable power lens system in the variable power relay optical system.

9. The microscope according to claim 8, wherein the optical modulator is a phase plate.

* * * * *